(12) United States Patent
Myers et al.

(10) Patent No.: US 11,540,545 B2
(45) Date of Patent: Jan. 3, 2023

(54) METHOD FOR ENHANCING A FOOD ITEM

(71) Applicants: Scott Myers, Bakersfield, CA (US); William Myers, Bakersfield, CA (US)

(72) Inventors: Scott Myers, Bakersfield, CA (US); William Myers, Bakersfield, CA (US)

(73) Assignee: MILL IT, INC., Bakersfield, CA (US)

( * ) Notice: Subject to any disclaimer, the term of this patent is extended or adjusted under 35 U.S.C. 154(b) by 749 days.

(21) Appl. No.: 16/433,272

(22) Filed: Jun. 6, 2019

(65) Prior Publication Data
US 2020/0037652 A1 Feb. 6, 2020

Related U.S. Application Data

(63) Continuation-in-part of application No. 16/179,933, filed on Nov. 3, 2018, and a continuation-in-part of application No. 16/179,934, filed on Nov. 3, 2018, now abandoned.

(60) Provisional application No. 62/713,049, filed on Aug. 1, 2018.

(51) Int. Cl.
*A23L 33/135* (2016.01)
*A23L 27/60* (2016.01)
*A23L 33/00* (2016.01)
*A23L 27/12* (2016.01)

(52) U.S. Cl.
CPC ............. *A23L 33/135* (2016.08); *A23L 27/12* (2016.08); *A23L 27/60* (2016.08); *A23L 33/40* (2016.08); *A23V 2002/00* (2013.01)

(58) Field of Classification Search
CPC .......... A23V 2200/264; A23V 2002/00; A23L 33/135; A23L 33/40; A23L 27/12
See application file for complete search history.

(56) References Cited

U.S. PATENT DOCUMENTS

2016/0113311 A1* 4/2016 Cadena-Garcia ....... A23L 7/117
426/18
2016/0192682 A1* 7/2016 Bhargava ............. A23C 11/106
435/252.4

FOREIGN PATENT DOCUMENTS

WO 2017185093 A1 10/2017

* cited by examiner

*Primary Examiner* — Erik Kashnikow
*Assistant Examiner* — Assaf Zilbering
(74) *Attorney, Agent, or Firm* — Michael Best & Friedrich LLP

(57) ABSTRACT

Method for enhancing a food item by apply a hypoallergenic, plant-based vegan dressing by combining water with a hypoallergenic-substrate, and at least one or more of sunflower seed butter and/or coconut cream. The resulting dressing is then subjected to a preservation process. In an alternative method, the resulting dressing is also inoculated in order to reduce its pH.

19 Claims, 13 Drawing Sheets

METHOD FOR ENHANCING A FOOD ITEM

RELATED APPLICATIONS

The present application claims priority to U.S. Provisional Application Ser. No. 62/713,049 filed on Aug. 1, 2018 and entitled "METHOD AND COMPOSITION FOR HYPOALLERGENIC PLANT-BASED SUBSTRATE FOR CULTURED AND NON-CULTURED FOOD PRODUCTS", by Myers, et al.; and to U.S. Non-Provisional application Ser. No. 16/179,933 filed on Nov. 3, 2018 and entitled METHOD FOR PREPARATION OF HYPOALLERGENIC PLANT-BASED SUBSTRATE FOR CULTURED AND NON-CULTURED FOOD PRODUCTS, by Myers, et al.; and to U.S. Non-Provisional application Ser. No. 16/179,934 filed on Nov. 3, 2018 and entitled COMPOSITION OF HYPOALLERGENIC PLANT-BASED SUBSTRATE FOR CULTURED AND NON-CULTURED FOOD PRODUCTS, by Myers, et al.; the text and figures of each of these applications is incorporated by reference into this application in their entireties.

BACKGROUND

The food industry now has an increased awareness of the beneficial role of probiotics in the diet. There is also a growing shift to more sustainable plant-based foods that goes beyond veganism. Globally, there is an increased incidence of severe food allergies among children and many ethnic groups that are lactose intolerant. Other dietary trends include reducing sugar, increasing fiber and adding seed butters to the diet.

A growing body of clinical evidence supports that some illnesses can be treated by consumption of foods containing specific strains of live bacteria called probiotics. Not all probiotics are the same with different strains having different effects. Most often, they are absorbed in the stomach or intestines and travel through the bloodstream to the rest of the body to provide health benefits.

Clinical research has been documented for strain-specific probiotics in the treatment or prevention of diarrhea; constipation, irritable bowel syndrome, ulcerative colitis, vaginal infections, urinary tract infections, the recurrence of bladder cancer, and dermatitis. Additional clinical evidence is emerging documenting the role of probiotic strains in weight control, sports enhancement, cognitive function and mood, diabetes management, celiac disease, allergies, heart health and several other conditions.

The food industry has seen the rapid growth in the introduction of cultured and non-cultured plant-based food products traditionally and typically associated with the dairy industry. Innova Market Insights data shows that the number of new food and beverage launches tracked with plant-based claims in the U.S. witnessed a 54 percent compound annual growth rate from 2013 to 2017. Plant-based food product introductions grew at 69 percent in this five-year period, while plant-based beverages witnessed a 38 percent growth.

According to the International Food Information Council, 21 percent of Americans said they have an improved opinion about the healthfulness of plant-based products, and 69 percent are trying to consume more. While these products roll out across the globe, Americans consumed more plant-based products than any other region in 2017 and this trend is expected to grow.

Many of these early plant-based products were made with soybeans or tree nuts, excluding from their target audience a sizeable portion of the US population that suffers from these severe food allergies.

Researchers estimate that up to 15 million Americans have food allergies, including 5.9 million children under age 18. About 30 percent of these children are allergic to more than one food. Eight major food allergens—milk, egg, peanut, tree nuts, wheat, soy, fin fish and crustacean shellfish—are responsible for about 90% of the most serious food allergy reactions in the United States.

Among US children, the most common food allergies include peanut, milk, crustacean shellfish, tree nut, egg, fin fish, wheat and soy. An emerging concern, sesame, is the ninth most common food allergen affecting many children. The Centers for Disease Control and Prevention reports that the prevalence of food allergy in children increased by 50 percent between 1997 and 2011. Between 1997 and 2008, the prevalence of peanut or tree nut allergy more than tripled in U.S. children.

Each year in the U.S., 200,000 people require emergency medical care for allergic reactions to food. Childhood hospitalizations for food allergy tripled between the late 1990s and the mid-2000s. About 40 percent of children with food allergies have experienced a severe allergic reaction such as anaphylaxis.

Lactose intolerance is a digestive condition that happens when an individual does not produce enough lactase enzymes in the small intestine to digest the lactose in dairy products. Approximately 65 percent of the human population has a reduced ability to digest lactose after infancy. Lactose intolerance in adulthood is most prevalent in people of East Asian descent, affecting more than 90 percent of adults in some of these communities. Lactose intolerance is also very common in people of African, Arab, Jewish, Greek, Italian and Hispanic descent. The prevalence of lactose intolerance is lowest in populations with a long history of dependence on unfermented milk products as an important food source. For example, only about 5 percent of people of Northern European descent are lactose intolerant.

Symptoms of lactose intolerance include diarrhea, nausea, abdominal cramping and bloating. Some of the symptoms of lactose intolerance and a food allergy may be similar. However, the difference between intolerant to dairy and having a food allergy to dairy is important. Consuming a dairy product can make you miserable if you are intolerant to it. The reaction to a food allergy can be life threatening. There is no cure for lactose intolerance but you can manage your symptoms by avoiding dairy products or by taking an enzyme medication to assist with the lactose breakdown in your intestines.

BRIEF DESCRIPTION OF THE DRAWINGS

Several alternative embodiments will hereinafter be described in conjunction with the appended drawings and figures, wherein like numerals denote like elements, and in which.

DETAILED DESCRIPTION

Figure 1:
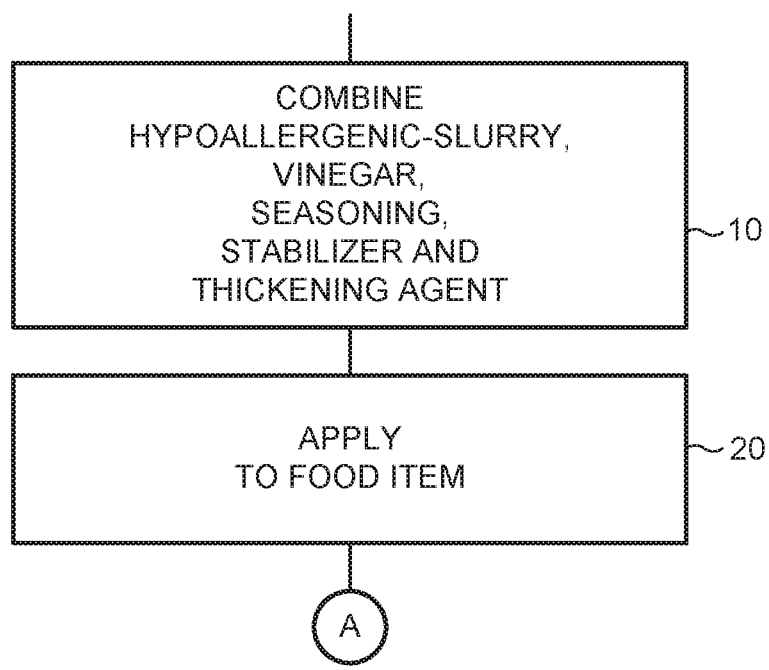
FIG. 1 is a flow diagram that depicts one example method for enhancing a food item with a hypoallergenic, plant-based vegan product.

In the interest of clarity, several example alternative methods are described in plain language. Such plain language descriptions of the various steps included in a particular method allow for easier comprehension and a more fluid description of a claimed method and its application. Accordingly, specific method steps are identified by the term "step" followed by a numeric reference to a flow diagram presented in the figures, e.g. (step 5). All such method "steps" are intended to be included in an open-ended enumeration of steps included in a particular claimed method. For example, the phrase "according to this example method, the item is processed using A" is to be given the meaning of "the present method includes step A, which is used to process the item". All variations of such natural language descriptions of method steps are to be afforded this same open-ended enumeration of a step included in a particular claimed method.

Unless specifically taught to the contrary, method steps are interchangeable and specific sequences may be varied according to various alternatives contemplated. Accordingly, the claims are to be construed within such structure. Further, unless specifically taught to the contrary, method steps that include the phrase " . . . comprises at least one or more of A, B, and/or C . . . " means that the method step is to include every combination and permutation of the enumerated elements such as "only A", "only B", "only C", "A and B, but not C", "B and C, but not A", "A and C, but not B", and "A and B and C". This same claim structure is also intended to be open-ended and any such combination of the enumerated elements together with a non-enumerated element, e.g. "A and D, but not B and not C", is to fall within the scope of the claim. Given the open-ended intent of this claim language, the addition of a second element, including an additional of an enumerated element such as "2 of A", is to be included in the scope of such claim. This same intended claim structure is also applicable to apparatus and system claims.

It should likewise be appreciated that the method steps herein described are useful in manufacture of a composition of matter, which various embodiments are claimed as well. The composition of matter is evident from the method of production and from the claims hereto appended. When a composition is formed for a cultured product, there will remain a latent fermentation agent. A latent fermentation agent is defined herein as a fermentation agent that is substantially not active at lower pH levels. The stated combinations are, contrary to ordinary fermentation of dairy and plant based matter, less likely to post acidify.

Traditional methods of delivering probiotics in food are often dairy-based. With food allergens and lactose intolerance on the rise, the hypoallergenic substrate described in the incorporated references is a better way to deliver these probiotics and their health benefits.

The cultured, processed, hypoallergenic, plant-based, vegan slurry described in the incorporated references is combined with hypoallergenic vegetable oils, vinegars, seasonings, herbs, salt, sweeteners, stabilizers, thickeners to create hypoallergenic, plant-based dressings in low fat, reduced fat and regular fat versions.

Edible plant-based oils include but are not limited to: Avocado, Coconut, Corn, Cottonseed, Olive, Palm, Peanut, Canola, Safflower, Sesame, Soybean, and Sunflower Oil. These oils can be refined, bleached and deodorized or cold pressed.

In one example embodiment, a low-fat ranch dressing comprises:

| Ingredients | Percent Total Formula |
| --- | --- |
| Cultured, Hypoallergenic Plant-Based Slurry | 91.15 |
| Distilled White Vinegar 50 Grain | 4.70 |
| Ranch Seasoning Blend | 2.30 |
| Salt | 1.25 |
| Locust Bean Gum | 0.60 |
| Total | 100.00 |

Various alternative embodiments of a ranch dressing are created by adding at least one or more of roasted garlic, chipotle, salsa, jalapeno, Buffalo seasoning, and/or sriracha.

In one example embodiment, a creamy Italian dressing comprises:

| Ingredients | Percent Total Formula |
| --- | --- |
| Cultured, Hypoallergenic Plant-Based Slurry | 91.15 |
| Distilled White Vinegar 120 Grain | 4.70 |
| Italian Seasoning Blend | 2.30 |
| Salt | 1.25 |
| Locust Bean Gum | 0.60 |
| Total | 100.00 |

FIG. 1 is a flow diagram that depicts one example method for enhancing a food item with a hypoallergenic, plant-based vegan product. According to this example method, a hypoallergenic, plant-based vegan dressing is made by combining a hypoallergenic-slurry, vinegar, seasoning, a stabilizer, and a thickening agent (step 10). It should likewise be appreciated that, according to various alternative example methods, the dressing is then applied to a food item in order to help enhance flavor and edibility of that food item (step 20).

It should be appreciated that many people prefer to have at least some amount of dressing on their food. This dressing enhances the flavor of the food and makes it easier to eat. It should further be appreciated that a salad can be made from many different edible ingredients. This can include all lettuce, all vegetables, all fruit, or even a mixture of various types of lettuce, fruits, vegetables, nuts, legumes, and other items. However, this listing of possible edible salad components is not intended to limit the scope of the claims appended hereto.

It should also be appreciated that many food items are enhanced by dressings. For example, one form of a thickened dressing comprises a dip. A dip is often used for vegetables, potato chips, and the like. Dips are also commonly used to enhance the moisture of some foods such as chicken fingers or to modify the flavor of other foods, such as "hot wings" where a dip is used to temper the spicy seasoning used in the hot wings.

A less viscous form of a dressing is typically used as a sauce for foods that are served at a hot temperature. For example, various sauces are prepared for use over pasta or vegetables. For example, some pasta sauces include an Alfredo sauce, a mushroom sauce, a creamy chicken sauce and/or a cheese sauce. Cheese sauces are also used to enhance vegetables. All of these examples of dressings, including more viscous dips and less viscous sauces are presented here are not intended to limit, but rather to illustrate the wide scope of the claims appended hereto.

It should also be appreciated that the difference between many dressings is what seasonings are used. For instance, ranch and Caesar are both creamy dressings but are distinguishable largely due to their flavor and seasonings. Thus, the method heretofore described is useful in making a large variety of different dressings that are suitable for widely diverse use cases and tastes. However, it should be appreciated that any such illustrative use cases, including ranch and Caesar dressing, is not intended to limit the scope of the claims appended hereto.

Figure 2:
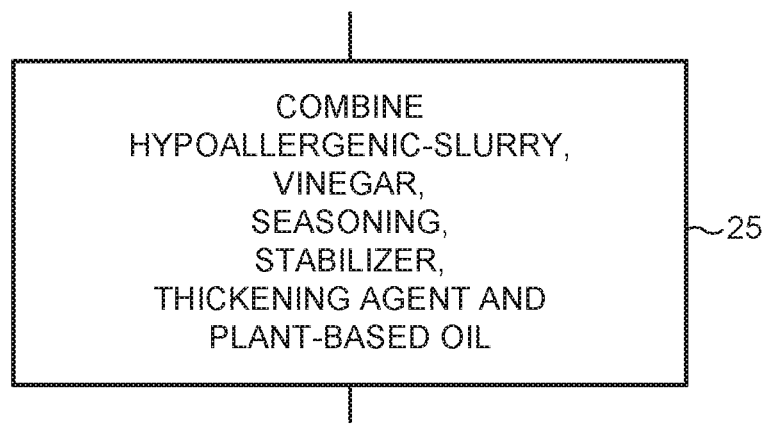
FIG. 2 is a flow diagram that depicts one alternative example method wherein the dressing was previously created by adding a plant-based oil.

FIG. 2 is a flow diagram that depicts one alternative example method wherein the dressing was previously created by adding a plant-based oil. According to one alternative example method, making a dressing comprises combining the hypoallergenic-slurry, vinegar, seasoning, stabilizer, and thickening agent with plant based oil (step 25). Various plant-based oils are contemplated including at least one or more of avocado, coconut, corn, cottonseed, olive, palm, peanut, canola, safflower, sesame, soybean, and/or sunflower oil.

Figure 3:
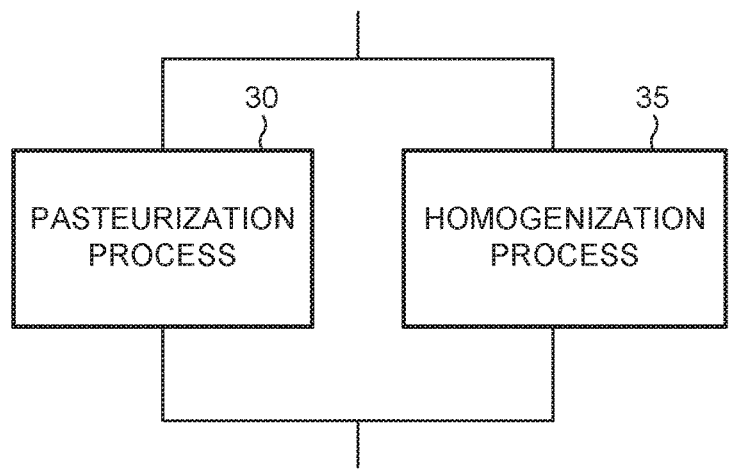
FIG. 3 is a flow diagram that depicts alternative example methods for subjecting the hypoallergenic slurry to a preservation process.

FIG. 3 is a flow diagram that depicts alternative example methods for subjecting the hypoallergenic slurry to a preservation process. According to one alternative example method, preservation is accomplished by a method step for subjecting the products to a pasteurization process (step 30). In yet another alternative example method, preservation is accomplished by a method step for subjecting the product to a homogenization process (step 35).

Figure 4:
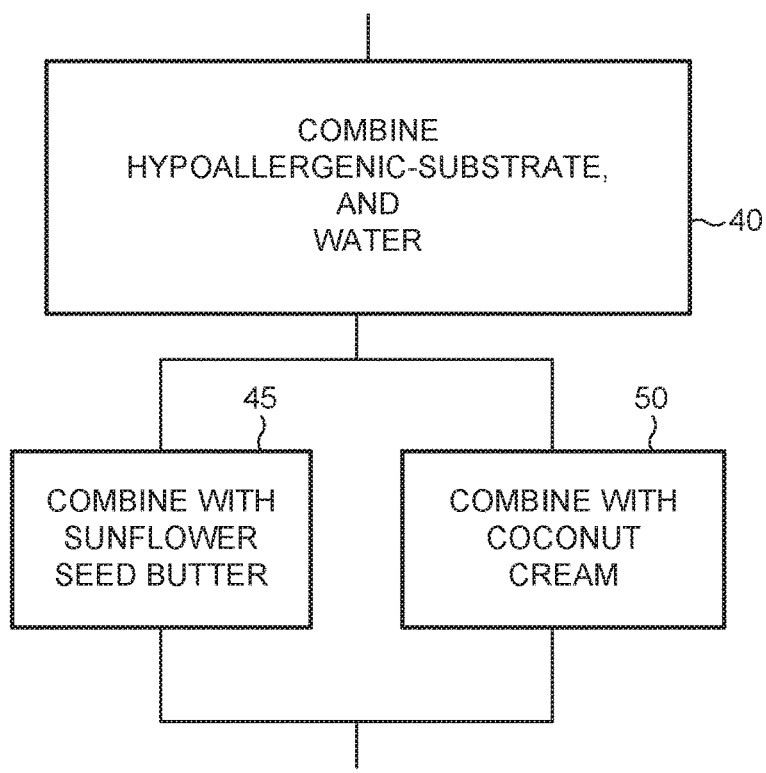
FIG. 4 is a flow diagram that depicts one example method for forming a hypoallergenic-slurry.

FIG. 4 is a flow diagram that depicts one example method for forming a hypoallergenic-slurry. According to this example method, a hypoallergenic-slurry is made by combining water with a hypoallergenic substrate (step 40). In continuation of creating the hypoallergenic-slurry, the water is further combined with a sunflower seed butter (step 45).

In one alternative method, the hypoallergenic-slurry is created by further combining the water with a coconut cream (step 50).

Figure 5:
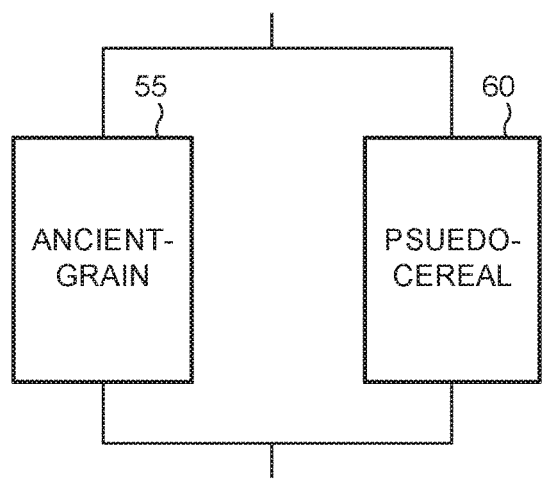
FIG. 5 is a flow diagram that depicts alternative example methods for combining water with a hypoallergenic-substrate based on alternative substrates.

FIG. 5 is a flow diagram that depicts alternative example methods for combining water with a hypoallergenic-substrate based on alternative substrates. It should be appreciated that dairy allergens, lactose, cholesterol, soy and/or tree nut allergens are not included in a hypoallergenic-substrate. According to one alternative example embodiment, the method for creating a dressing comprises a step wherein combining the water with a hypoallergenic-substrate comprises combining the water with an ancient-grain (step 55). In yet another alternative example embodiment, the method for creating a dressing comprises a step wherein combining the water with a hypoallergenic-substrate comprises combining the water with a pseudo-cereal (step 60).

Figure 6:
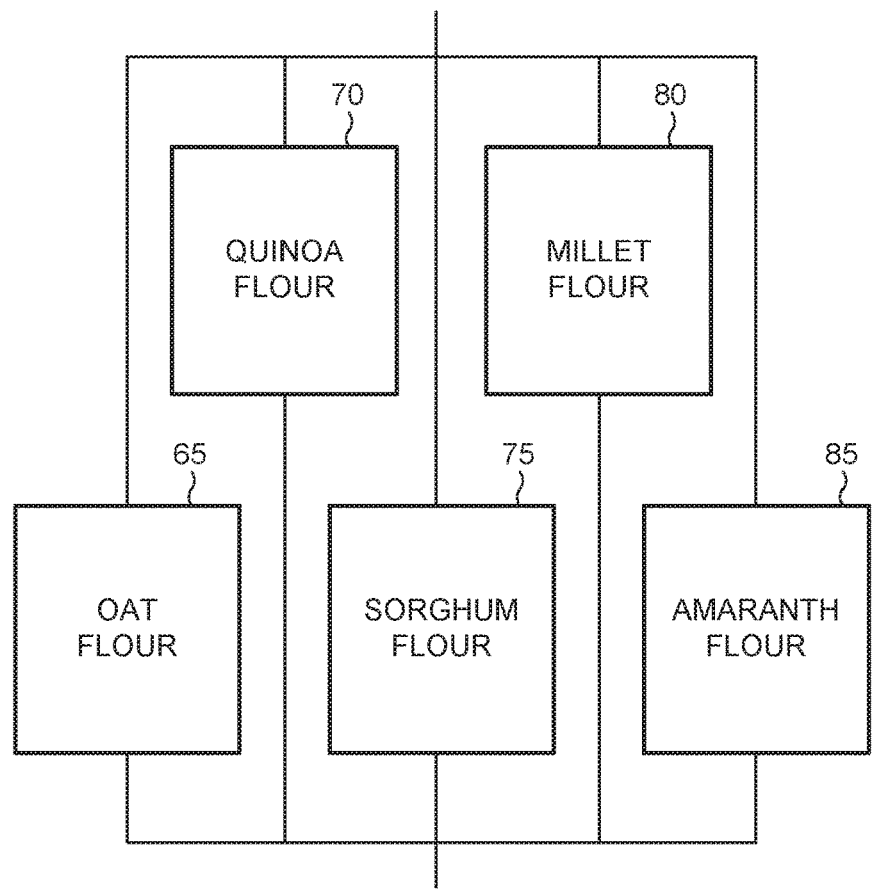
FIG. 6 is a flow diagram that depicts one alternative method wherein various types of hypoallergenic-substrates are combined with water.
Figure 7:
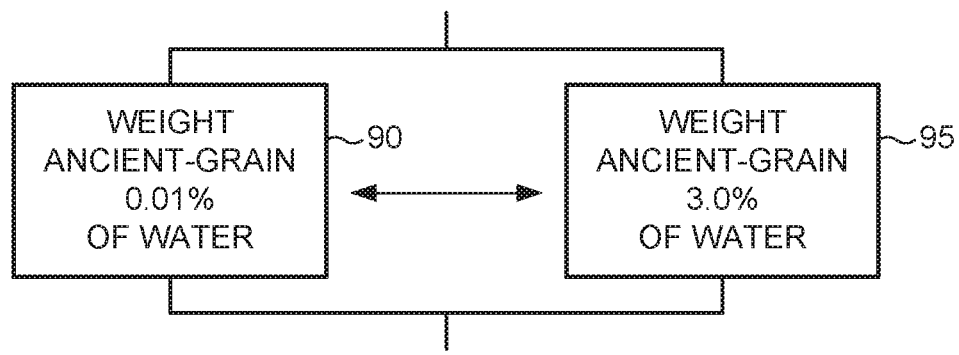
FIGS. 7 through 12 are flow diagrams that depict alternative methods for combining water with a hypoallergenic-substrate based on a range of ratios of weights.
Figure 8:
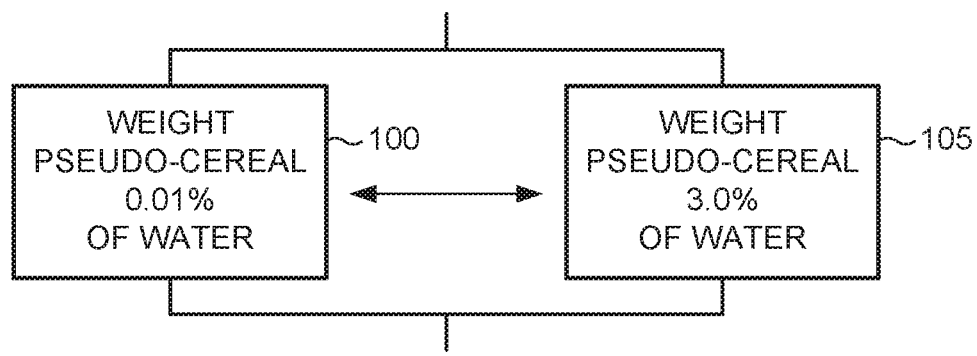
Figure 9:
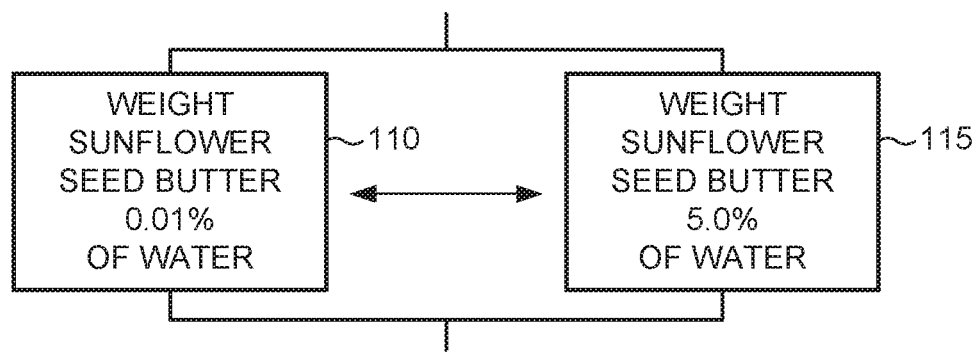
Figure 10:
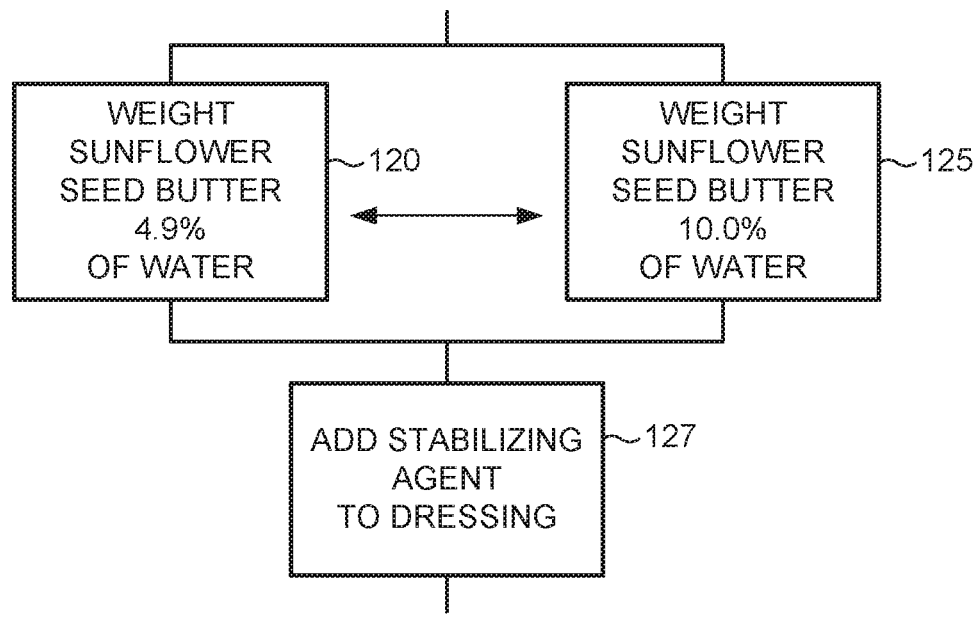
Figure 11:
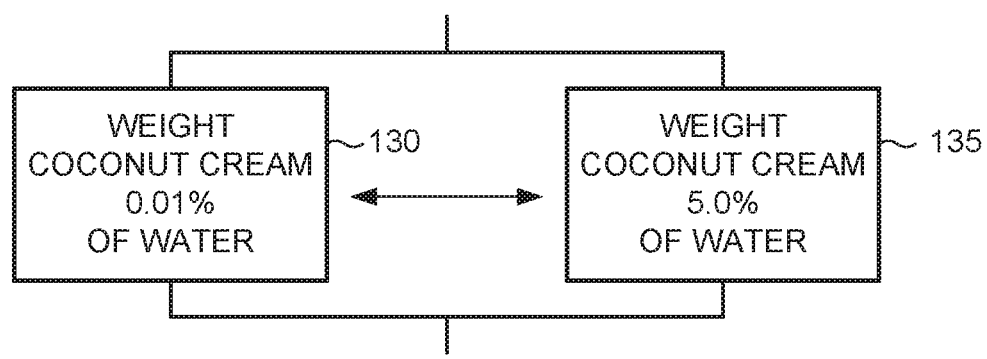
Figure 12:
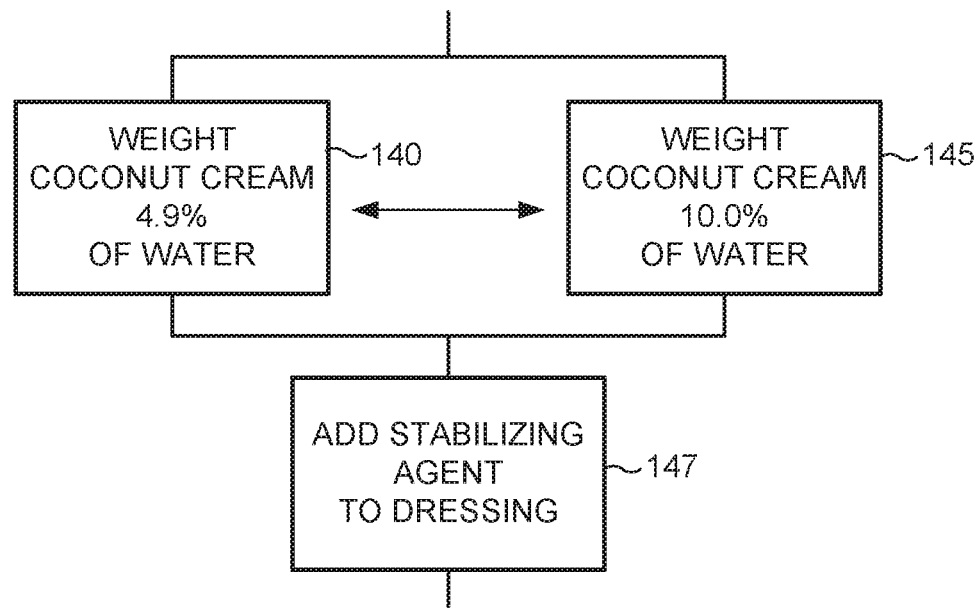

FIG. 6 is a flow diagram that depicts one alternative method wherein various types of hypoallergenic-substrates are combined with water. According to one alternative example method, a step is included for combining an oat flour (step 65) with water. In yet another alternative example embodiment, an included step provides for combining quinoa flour (step 70) with water. In yet another alternative method, sorghum flour is combined with water (step 75) in an included step. Millet flour (step 80) is used in yet an alternative included step for combining water with a hypoallergenic-substrate Amaranth flour (step 85) is used in yet another alternative included step for combining water with a hypoallergenic-substrate. It should be appreciated that these various types of alternative ingredients, used in a corresponding included method step, provide a base that is suitable as a base for dressings.

FIGS. 7 through 12 are flow diagrams that depict alternative methods for combining water with a hypoallergenic-substrate based on a range of ratios of weights. In one alternative example embodiment, combining water with a hypoallergenic-substrate comprises combining with the water an ancient grain in a ratio by weight wherein the weight of the ancient-grain is at a minimum of 0.01% of the water (step 90). Various ratios beginning at 0.01% and running through 3.0% of the weight of water in the weight of an ancient-grain (step 95) is to be included in the method claims hereto appended.

In yet another alternative example embodiment, combining water with a hypoallergenic-substrate comprises combining with the water a pseudo-cereal in a ratio by weight wherein the weight of the pseudo-cereal is at a minimum of 0.01% of the water (step 100). Various ratios beginning at 0.01% and running through 3.0% of the weight of water in the weight of a pseudo-cereal (step 105) is to be included in the method claims hereto appended.

According to yet another alternative method, an additional included step provides for combining water with sunflower seed butter in a ratio by weight wherein the weight of the sunflower seed butter is at a minimum of 0.01% of the water (step 110). Various ratios beginning at 0.01% and running through 5.0% of the weight of water in the weight of a sunflower seed butter (step 115) is to be included in the method claims hereto appended.

According to this alternative variation of the present method, various ratios beginning at 4.9% (step 120) and running through 10.0% (step 125) of the weight of water in the weight of a sunflower seed butter. This alternative example method also includes a step whereby a stabilizing agent is then added to the dressing (step 127). It should be appreciated that, although a preferred method provides for adding an amount of sunflower seed butter up to 5% of the weight of the water, other variations of the present method are acceptable where the amount of sunflower seed butter combined with the water in an amount of up to 10% of the weight of the water. It should be appreciated that, in these variations of the method, much more stabilizer is required, relative to the preferred methods, to help retard the separation of the sunflower seed butter from the water.

One alternative method provides for combining water with coconut cream in a ratio by weight wherein the weight of the coconut cream is at a minimum of 0.01% of the water (step 130). Various ratios beginning at 0.01% and running through 5.0% of the weight of water in the weight of a coconut cream (step 135) is to be included in the method claims hereto appended. According to yet another variation of the present method, various ratios beginning at 4.9% (step 140) and running through 10.0% (step 145) of the weight of water in the weight of a coconut cream is to be included in the method claims hereto appended. This alternative example method also includes a step whereby a stabilizing agent is then added to the dressing (step 147). It should be appreciated that, although a preferred method provides for adding an amount of coconut cream up to 5% of the weight of the water, other variations of the present method are acceptable where the amount of coconut cream combined with the water in an amount of up to 10% of the weight of the water. It should be appreciated that, in these variations of the method, much more stabilizer is required, relative to the preferred methods, to help retard the separation of the coconut cream from the water.

Figure 13:
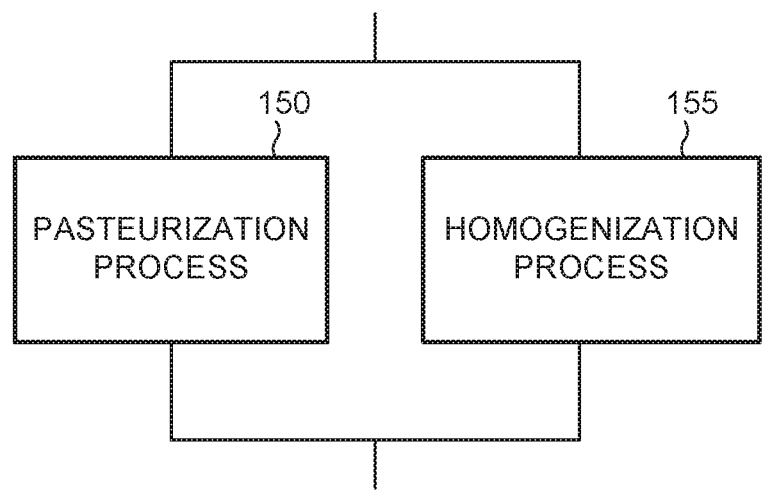
FIG. 13 is a flow diagram that depicts alternative example methods for subjecting the hypoallergenic-slurry to a preservation process.

FIG. 13 is a flow diagram that depicts alternative example methods for subjecting the hypoallergenic-slurry to a preservation process. According to one alternative example method, preservation is accomplished by a method step for subjecting the hypoallergenic-slurry to a pasteurization process (step 150). In yet another alternative example method, preservation is accomplished by a method step for subjecting the hypoallergenic-slurry to a homogenization process (step 155).

Figure 14:
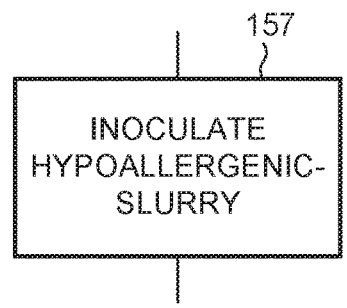
FIGS. 14 through 16 are flow diagrams that depict alternative methods for inoculating the hypoallergenic-slurry.
Figure 15:
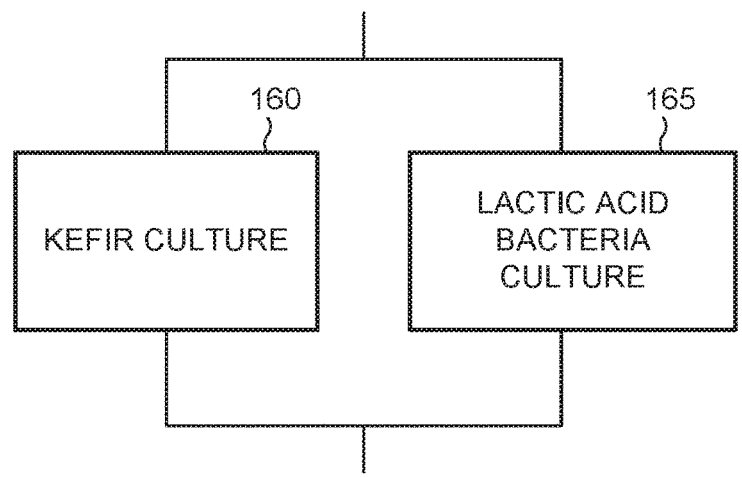
Figure 16:
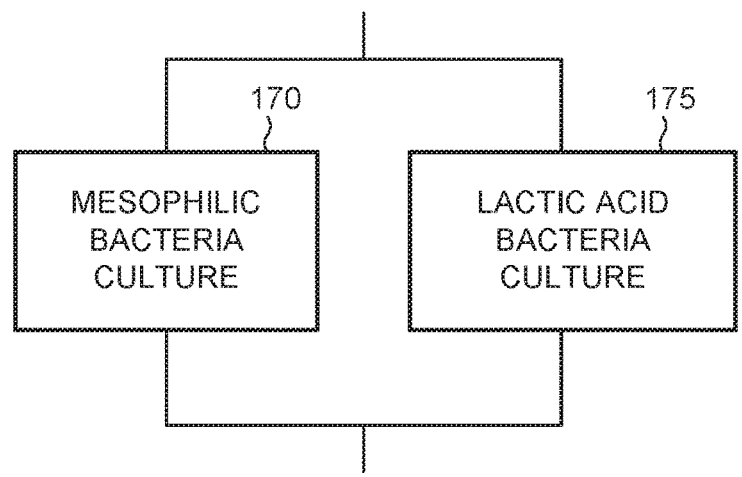

FIGS. 14 through 16 are flow diagrams that depict alternative methods for inoculating the hypoallergenic-slurry. It has been discovered that hypoallergenic-slurry can be fermented using lactic acid and other mesophilic bacteria used for making yogurt, buttermilk and kefir. It has also been discovered that this plant-based substrate can be fermented without the specific addition of a monosaccharide or disaccharide. Accordingly, one alternative example method provides for inoculating the hypoallergenic-slurry (step 157). And in yet another alternative example method step, the hypoallergenic-slurry is inoculated with either a kefir culture (step 160) or a lactic acid bacteria culture (step 165). And in yet another alternative example method, the hypoallergenic-slurry is inoculated with a mesophilic bacteria culture (step 170) or a lactic acid bacteria culture (step 175).

Figure 17:
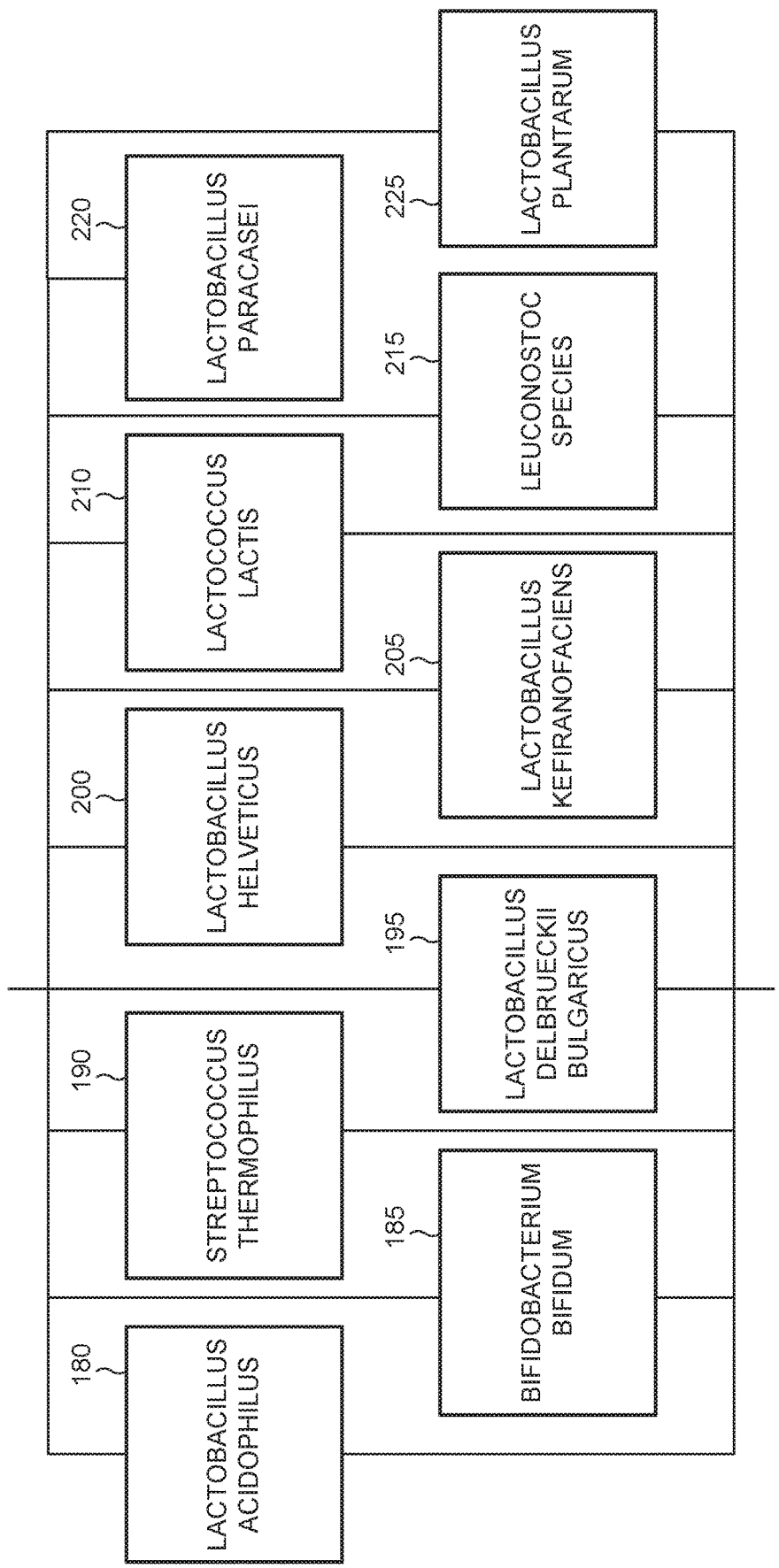
FIG. 17 is a flow diagram that depicts alternative example methods for inoculating a hypoallergenic-slurry with a fermentation agent.

FIG. 17 is a flow diagram that depicts alternative example methods for inoculating a hypoallergenic-slurry with a fermentation agent. According to these various alternative example methods, the included step of inoculating a hypoallergenic-slurry comprises inoculating a hypoallergenic-slurry with a fermentation agent including at least one or more of *Lactobacillus acidophilus* (step 180), *Bifidobacterium bifidum* (step 185), *Streptococcus thermophilus* (step 190), *Lactobacillus delbrueckii bulgaricus* (step 195), *Lactobacillus helveticus* (step 200), *Lactobacillus kefiranofaciens* (step 205), *Lactococcus lactis* (step 210), *Leuconostoc* species (step 215), *Lactobacillus paracasei* (step 220) and/or *Lactobacillus plantarum* (step 225).

Figure 18:
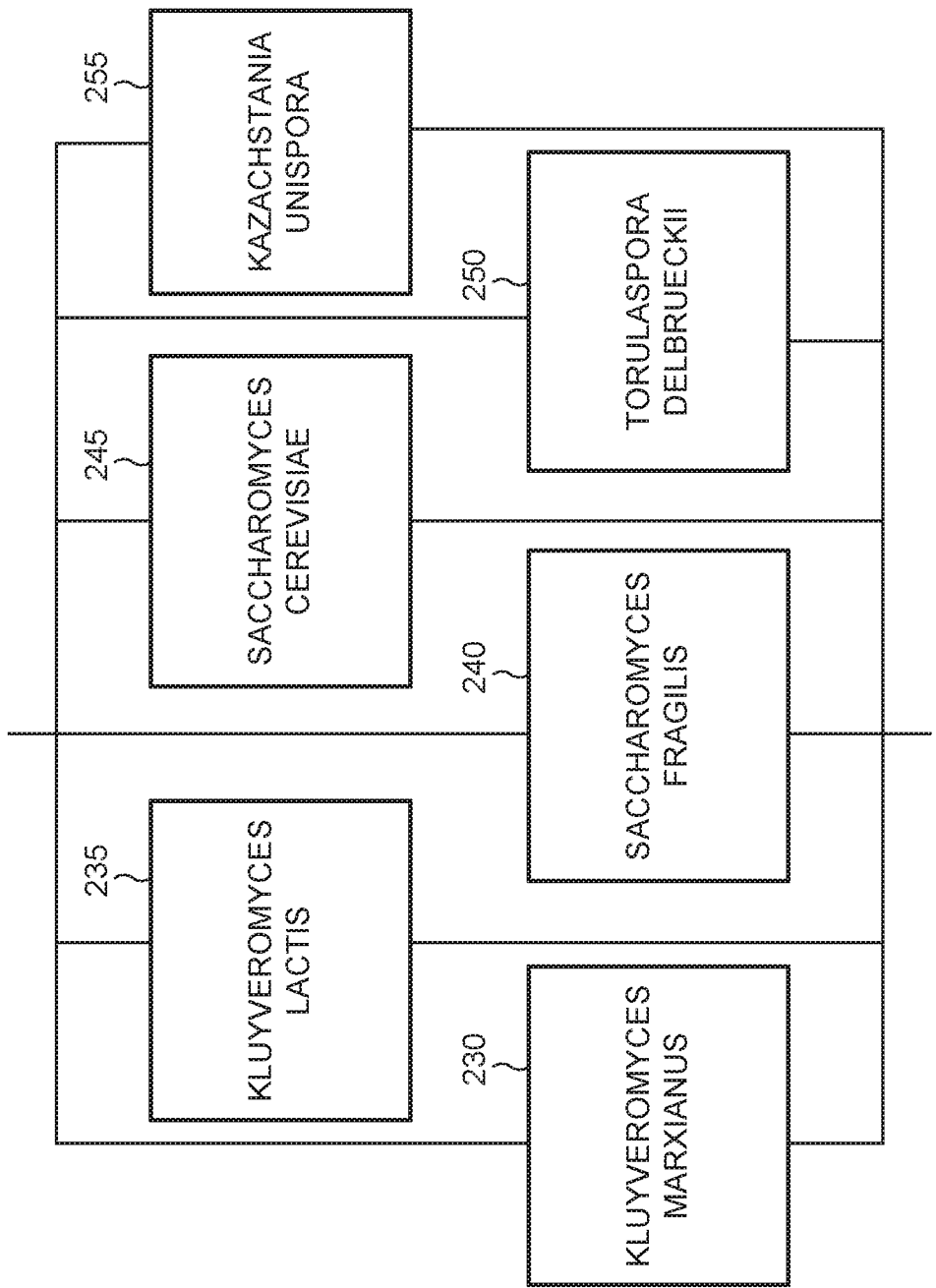
FIG. 18 is a flow diagram that depicts yet additional alternative example methods for inoculating a hypoallergenic-slurry with a fermentation agent.

FIG. 18 is a flow diagram that depicts yet additional alternative example methods for inoculating a hypoallergenic-slurry with a fermentation agent. According to these various alternative example methods, the included step of inoculating a hypoallergenic-slurry comprises inoculating a hypoallergenic-slurry with a fermentation agent including at least one or more of *Kluyveromyces marxianus* (step 230), *Kluyveromyces lactis* (step 235), *Saccharomyces fragilis* (step 240), *Saccharomyces cerevisiae* (step 245), *Torulaspora delbrueckii* (step 250), and/or *Kazachstania unispora* (step 255).

Figure 19:
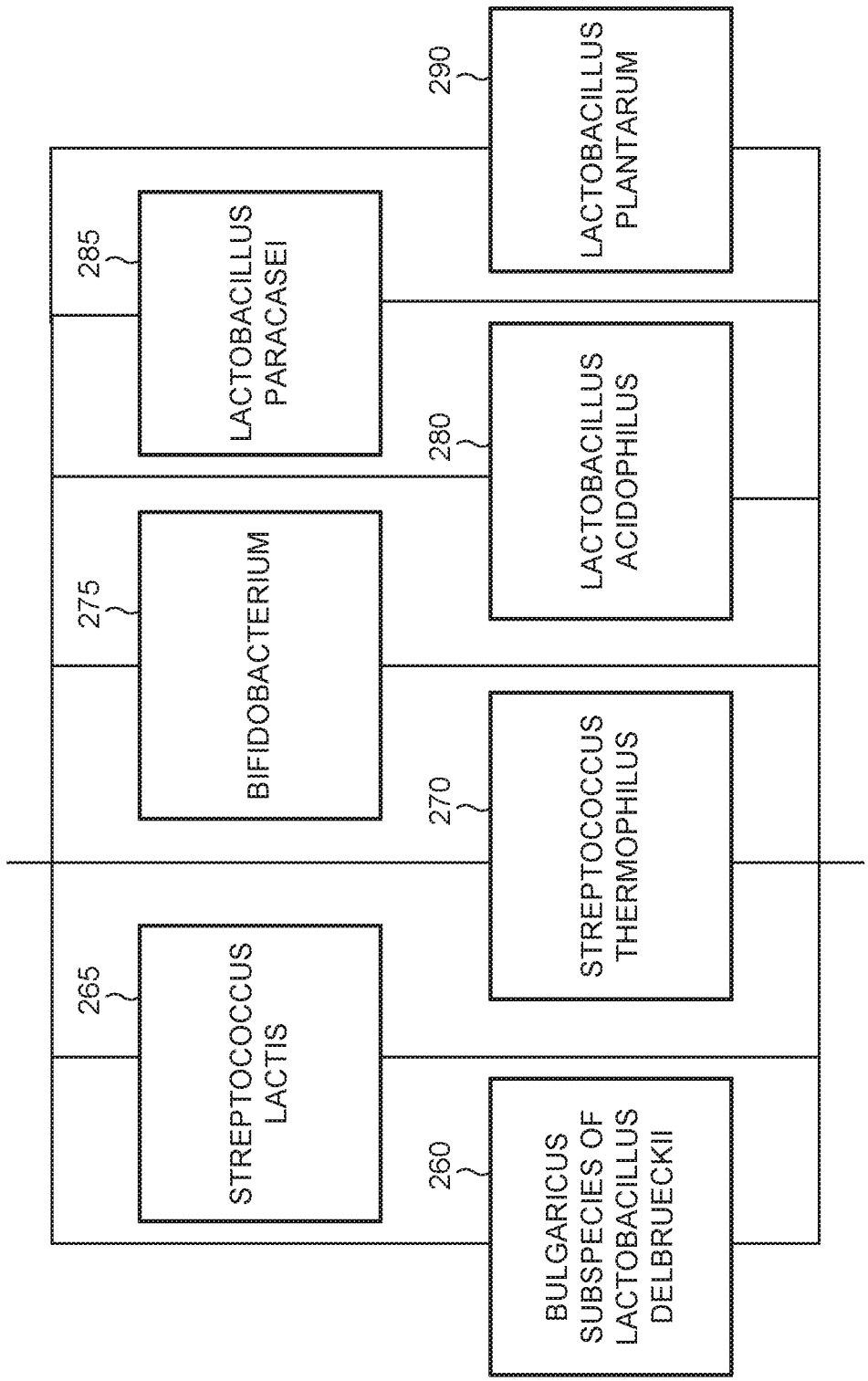
FIG. 19 is a flow diagram that depicts yet additional alternative example methods for inoculating a hypoallergenic-slurry with a fermentation agent.

FIG. 19 is a flow diagram that depicts yet additional alternative example methods for inoculating a hypoallergenic-slurry with a fermentation agent. According to these various alternative example methods, the included step of inoculating a hypoallergenic-slurry comprises inoculating a hypoallergenic-slurry with a fermentation agent including at least one or more of *Lactobacillus delbrueckii bulgaricus* (step 260), *Streptococcus lactis* (step 265), *Streptococcus thermophilus* (step 270), *Bifidobacterium* (step 275), *Lactobacillus acidophilus* (step 280), *Lactobacillus paracasei* (step 285) and/or *Lactobacillus plantarum* (step 290).

Figure 20:
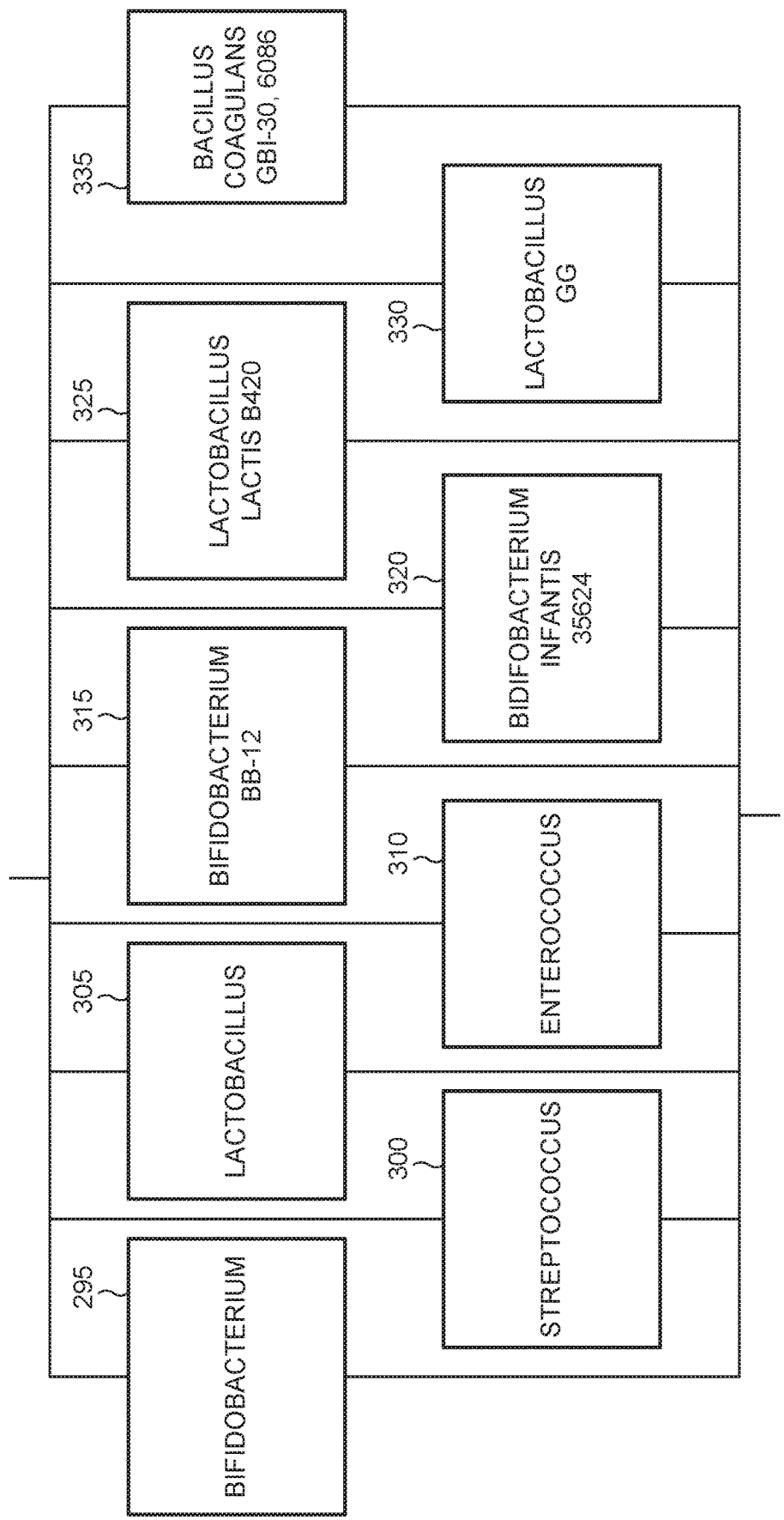
FIG. 20 is a flow diagram that depicts yet additional alternative example methods for inoculating a hypoallergenic-slurry with a probiotic strain.
Figure 21:
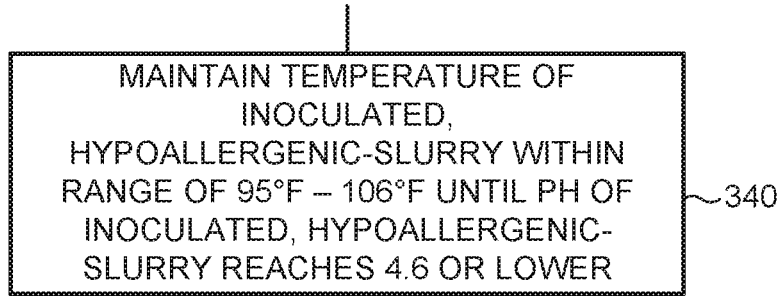
FIGS. 21 through 26 are flow diagrams that depict alternative methods for adjusting the pH of a hypoallergenic-slurry.
Figure 22:
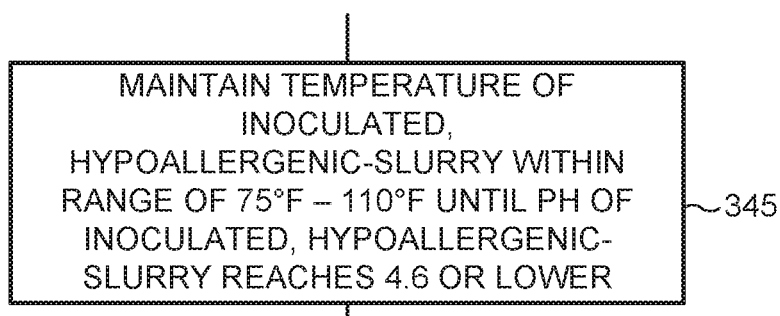
Figure 23:
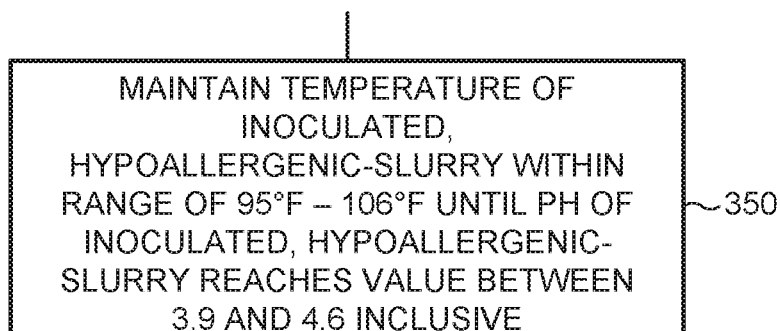
Figure 24:
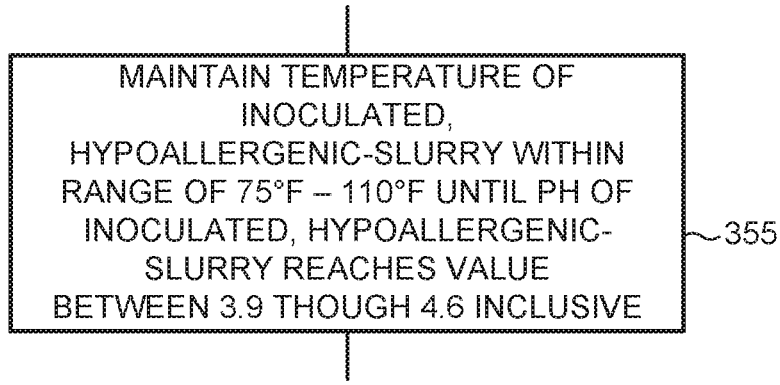
Figure 25:
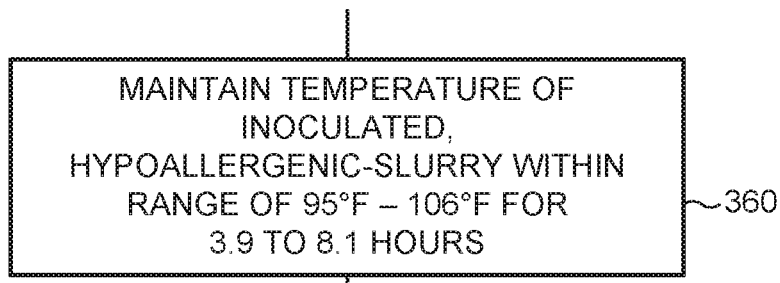
Figure 26:
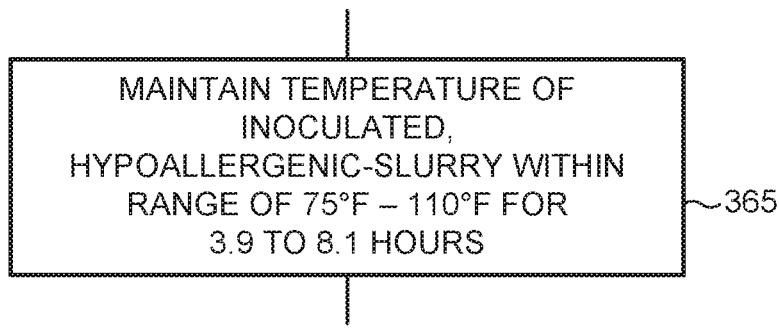

FIG. 20 is a flow diagram that depicts yet additional alternative example methods for inoculating a hypoallergenic-slurry with a probiotic strain. According to these various alternative example methods, the included step of inoculating a hypoallergenic-slurry comprises inoculating a hypoallergenic-slurry with a probiotic strain including at least one or more of *Bifidobacterium* (step 295), *Streptococcus* (step 300), *Lactobacillus* (step 305), *Enterococcus* (step 310), *Bifidobacterium* BB-12 (step 315), *Bifidobacterium infantis* 35624 (step 320), *Lactobacillus lactis* B420 (step 325), *Lactobacillus* GG (step 330), and/or *Bacillus coagulans* GBI-30, 6086 (step 335).

FIGS. 21 through 26 are flow diagrams that depict alternative methods for adjusting the pH of a hypoallergenic-slurry. According to one alternative example method, a step is included for maintaining the temperature of the hypoallergenic slurry within a range substantially between 95° F. and 106° F. until the pH of the hypoallergenic-slurry reaches 4.6 or lower (step 340). According to yet another alternative example method, a step is included for maintaining the temperature of the hypoallergenic slurry within a range substantially between 75° F. and 110° F. until the pH of the hypoallergenic slurry reaches 4.6 or lower (Step 345).

According to other various example methods, a step is included for maintaining the temperature of the hypoallergenic-slurry within a range substantially between 95° F. and 106° F. until the pH of the hypoallergenic-slurry reaches a value of 3.9 through 4.6, inclusive of the end points of this range (step 350). According to yet another alternative example method, a step is included for maintaining the temperature of the hypoallergenic-slurry within a range substantially between 75° F. and 110° F. until the pH of the hypoallergenic-slurry reaches a value of 3.9 through 4.6, inclusive of the end points of this range (step 355).

According to other various example methods, a step is included for maintaining the temperature of the hypoallergenic-slurry within a range substantially between 95° F. and 106° F. for an amount of time between 3.9 and 8.1 hours (step 360). In another alternative method, a step is included for maintaining the temperature of the hypoallergenic-slurry within a range substantially between 75° F. and 110° F. for an amount of time between 3.9 and 8.1 hours (step 365).

While the present method and composition has been described in terms of several alternative and exemplary embodiments, it is contemplated that alternatives, modifications, permutations, and equivalents thereof will become apparent to those skilled in the art upon a reading of the specification and study of the drawings. It is therefore intended that the true spirit and scope of the claims appended hereto include all such alternatives, modifications, permutations, and equivalents.

What is claimed is:

1. A method for manufacturing a dressing, the method comprising:
   combining to form a hypoallergenic slurry:
   one or more hypoallergenic-substrates comprising ancient grains or pseudo-cereals;
   sunflower seed butter and coconut cream;
   one or more stabilizers; and
   water,
   pasteurizing and homogenizing the hypoallergenic-slurry to form a pasteurized, homogenized hypoallergenic-slurry;
   inoculating the pasteurized, homogenized hypoallergenic-slurry with one or more fermentation agents and fermenting for about 3.9 to 8.1 hours until the pH is about 4.6 or lower to form a fermented hypoallergenic-slurry; and
   combining the fermented hypoallergenic-slurry with one or more of vinegar, seasoning, or a thickening agent to form a dressing.

2. The method of claim 1, wherein the dressing further comprises a plant-based oil.

3. The method of claim 1, wherein:
   the hypoallergenic-slurry comprises a ratio by weight of the hypoallergenic-substrates being 0.01% to 3.0% of the weight of the water; and
   the hypoallergenic-slurry comprises a ratio by weight of the sunflower seed butter and coconut cream being 0.01% to 5.0% of the weight of the water.

4. The method of claim 1, wherein the ancient grains or pseudo-cereals comprise one or more of quinoa flour, sorghum flour, millet flour, and/or amaranth flour.

5. The method of claim 1, wherein the ratio by weight of the sunflower seed butter is 4.9% to 10.0% of the weight of the water.

6. The method of claim 1, wherein the ratio by weight of the coconut cream is 4.9% to 10.0% of the weight of the water.

7. The method of claim 1, wherein the fermentation agent comprises one or more of a kefir culture and/or lactic acid bacteria culture.

8. The method of claim 1, wherein the fermentation agent comprises one or more of a lactic acid bacteria culture and/or mesophilic bacteria culture.

9. The method of claim 1, wherein the fermentation agent comprises one or more of *Lactobacillus acidophilus*, *Bifidobacterium bifidum*, *Streptococcus thermophilus*, *Lactobacillus delbrueckii bulgaricus*, *Lactobacillus helveticus*, *Lactobacillus kefiranofaciens*, *Lactococcus lactis*, *Leuconostoc species*, *Lactobacillus paracasei*, and/or *Lactobacillus plantarum*.

10. The method of claim 1, wherein the fermentation agent comprises one or more of *Kluyveromyces marxianus*, *Kluyveromyces lactis*, *Saccharomyces fragilis*, *Saccharomyces cerevisiae*, *Torulaspora delbrueckii*, and/or *Kazachstania unispora*.

11. The method of claim 1 wherein the fermentation agent comprises one or more of *Lactobacillus delbrueckii bulgaricus*, *Streptococcus lactis*, *Streptococcus thermophilus*, *Bifidobacterium*, *Lactobacillus acidophilus*, *Lactobacillus paracasei*, and/or *Lactobacillus plantarum*.

12. The method of claim 1, wherein the fermentation agent comprises one or more of a *Bifidobacterium*, *Streptococcus*, *Lactobacillus*, *Enterococcus*, *Bifidobacterium* BB-12, *Bifidobacterium infantis* 35624, *Lactobacillus lactis* B420, *Lactobacillus* GG, and/or *Bacillus coagulans* GBI-30, 6086.

13. The method of claim 1, wherein the fermenting comprises: maintaining the temperature within a range of 95° F.-106° F. until the pH reaches 4.6 or lower.

14. The method of claim 1, wherein the fermenting comprises: maintaining the temperature within a range of 75° F.-110° F. until the pH reaches 4.6 or lower.

15. The method of claim 1, wherein the fermenting comprises: maintaining the temperature within a range of 95° F.-106° F. until the pH reaches 3.9 through 4.6 inclusive of end values of the range.

16. The method of claim 1, wherein the fermenting comprises: maintaining the temperature within a range of 75° F.-110° F. until the pH reaches value of 3.9 through 4.6 inclusive of end values of the range.

17. The method of claim 1, wherein the fermenting comprises: maintaining the temperature within a range of 95° F.-106° F. for a period of 3.9 to 8.1 hours.

18. The method of claim 1, wherein the fermenting comprises: maintaining the temperature within a range of 75° F.-110° F. for a period of 3.9 to 8.1 hours.

19. A method for manufacturing a dressing, the method comprising:
   combining to form a hypoallergenic-slurry:
   one or more ancient grains or pseudo-cereals comprising one or more of quinoa flour, sorghum flour, millet flour, or amaranth flour;
   sunflower seed butter and coconut cream;
   one or more stabilizers; and
   water,
   wherein:
      the hypoallergenic-slurry comprises a ratio by weight of the ancient grains or pseudo-cereals being 0.01% to 3.0% of the weight of the water;
      the hypoallergenic-slurry comprises a ratio by weight of the sunflower seed butter being 4.9% to 10% of the weight of the water; and
      the hypoallergenic-slurry comprises a ratio by weight of the coconut cream being 4.9% to 10% of the weight of the water;
   pasteurizing and homogenizing the hypoallergenic-slurry to form a pasteurized, homogenized hypoallergenic-slurry;
   inoculating the pasteurized, homogenized hypoallergenic-slurry with one or more fermentation agents and fermenting at temperature of 75° F.-110° F. for 3.9 to 8.1 hours until the pH is about 4.6 or lower to form a fermented hypoallergenic-slurry; and
   combining the fermented hypoallergenic-slurry with one or more of vinegar, a plant-based oil, seasoning, and a thickening agent to form a dressing.

* * * * *